United States Patent
Beaudoin

(10) Patent No.: US 11,519,481 B2
(45) Date of Patent: Dec. 6, 2022

(54) VEHICLE TRANSMISSION SYSTEM AND METHOD FOR OPERATION OF THE TRANSMISSION SYSTEM

(71) Applicant: LES MOTEURS NORDRESA INC., Laval (CA)

(72) Inventor: Marc-Antoine Beaudoin, Montreal (CA)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/378,227

(22) Filed: Jul. 16, 2021

(65) Prior Publication Data
US 2022/0034385 A1    Feb. 3, 2022

Related U.S. Application Data

(60) Provisional application No. 63/059,049, filed on Jul. 30, 2020.

(51) Int. Cl.
| | |
|---|---|
| *F16H 3/66* | (2006.01) |
| *B60K 17/04* | (2006.01) |
| *B60K 1/00* | (2006.01) |
| *F16H 3/64* | (2006.01) |
| *F16H 3/62* | (2006.01) |

(52) U.S. Cl.
CPC ............... *F16H 3/66* (2013.01); *B60K 1/00* (2013.01); *B60K 17/046* (2013.01); *F16H 3/62* (2013.01); *F16H 3/64* (2013.01); *F16H 2200/201* (2013.01); *F16H 2200/2043* (2013.01)

(58) Field of Classification Search
CPC ............... F16H 3/62; F16H 2200/201; F16H 2200/2043
See application file for complete search history.

(56) References Cited

U.S. PATENT DOCUMENTS

| | | | |
|---|---|---|---|
| 4,070,927 | A | 1/1978 | Polak |
| 4,709,594 | A | 12/1987 | Maeda |
| 5,370,589 | A | 12/1994 | Leppelletier |
| 6,551,208 | B1 | 4/2003 | Holmes et al. |

(Continued)

FOREIGN PATENT DOCUMENTS

DE    102015216834 A1 *    3/2017    ............. B60K 6/365

OTHER PUBLICATIONS

Morozov, A. et al., "Design and Gear Shift Control of a Modular Swift-Shift Multi-Speed Transmission for EVs," Proceedings of the European Battery, Hybrid and Fuel Cell Electric Vehicle Congress, Dec. 1, 2015, Brussels, Belgium, 10 pages.

*Primary Examiner* — Stacey A Fluhart
(74) *Attorney, Agent, or Firm* — McCoy Russell LLP

(57) ABSTRACT

Methods and systems for a vehicle are provided. A transmission system includes, in one example, a first planetary gear set including a first ring gear and a first sun gear, a second planetary gear set that includes a second ring gear and a second sun gear, and a third planetary gear set that includes a third ring gear and a third sun gear. The transmission system further includes a first brake device configured to selectively ground the first ring gear, a second brake device configured to selectively ground the second ring gear, and a first lock-up clutch configured to selectively ground the first ring gear, wherein the first sun gear, the second sun gear, and the third sun gear are coupled in series.

16 Claims, 4 Drawing Sheets

(56) References Cited

U.S. PATENT DOCUMENTS

| | | |
|---|---|---|
| 6,953,409 B2 | 10/2005 | Schmidt et al. |
| 7,001,304 B2 | 2/2006 | Raghavan et al. |
| 7,175,561 B2 * | 2/2007 | Usoro ................... F16H 3/66 |
| | | 475/275 |
| 7,494,435 B2 | 2/2009 | Bucknor et al. |
| 8,870,704 B2 * | 10/2014 | Maurer ................... F16H 3/66 |
| | | 475/280 |
| 9,441,708 B2 | 9/2016 | Kimes et al. |
| 9,702,438 B2 | 7/2017 | Boulet et al. |
| 2006/0252594 A1 | 11/2006 | Bucknor et al. |

* cited by examiner

VEHICLE TRANSMISSION SYSTEM AND METHOD FOR OPERATION OF THE TRANSMISSION SYSTEM

CROSS REFERENCE TO RELATED APPLICATION

The present application claims priority to U.S. Provisional Patent Application No. 63/059,049, entitled "VEHICLE TRANSMISSION SYSTEM AND METHOD FOR OPERATION OF THE TRANSMISSION SYSTEM," and filed on Jul. 30, 2020. The entire contents of the above-listed application are hereby incorporated by reference for all purposes.

TECHNICAL FIELD

The present disclosure relates to a vehicle transmission system, and more particularly to a multi-speed transmission system and method for operation of said system.

BACKGROUND AND SUMMARY

Electric vehicles use multi-speed transmissions with discrete gear ratios. Some transmissions deploy planetary gear sets coupled to one another to achieve multiple selectable gears in a compact arrangement. When a transmission exhibits a power interruption during shifting, vehicle performance is decreased and vehicle drivability is diminished due to driver perceived noise, vibration, and harshness (NVH). The NVH may in certain scenarios cause premature degradation of transmission components. To increase performance and decrease NVH, such as vehicle jerks occurring during gearshift events, some vehicle applications (e.g., electric trucks) have made use of automatic and dual clutch transmissions for smoother gear shifting. In these automatic transmissions, friction clutches and brakes provide gearshift operation.

However, friction clutches may be relatively large in size and high in cost. Transmission brakes have been used in certain transmissions. Transmission inefficiencies may stem from the extended use of the transmission brakes. The brakes generate waste heat that may decrease brake efficiency and flow to brake actuators such as solenoids or hydraulic pumps, in some cases. Brake actuator performance may diminish due to the elevated actuator temperatures.

To overcome at least some of the aforementioned challenges, a transmission system is provided. The transmission system includes a first planetary gear set that includes a first ring gear and a first sun gear. The transmission system further includes a second planetary gear set that includes a second ring gear and a second sun gear as well as a third planetary gear set that includes a third ring gear and a third sun gear. In the system, the first, second, and third sun or ring gears are coupled in series. A first brake device configured to selectively ground the first ring or sun gear is included in the system. A second brake device configured to selectively ground the second ring or sun gear is further included in the system. A first lock-up clutch, in the system, is configured to selectively ground the first ring or sun gear. In this way, the brake devices and the lock-up clutch form a space efficient arrangement that provides multiple gear ratios. The system's adaptability is therefore increased. Using the brake devices and lock-up clutch in the aforementioned arrangement may also reduce the complexity and, in some cases, cost of the system when compared to transmissions utilizing friction clutches and brakes. Providing multiple gear ratios in the transmission enables an electric machine that may be attached to the transmission to operate more efficiently across a wider range of operating conditions, if desired.

In one example, the transmission system further includes a second lock-up clutch coupled to the second and third ring gears. The transmission system further includes a controller including executable instructions stored in non-transitory memory that cause the controller to coordinate operation of the first lock-up clutch, the second lock-up clutch, the first brake device, and the second brake device to transition the transmission system between a first gear ratio mode and a second gear ratio mode. For instance, the coordinated operation of the lock-up clutches and brake devices may include activating the first brake device while the first lock-up clutch is disengaged. After the first lock-up clutch is disengaged, the second brake device may be activated while the second lock-up clutch remains engaged. In this way, the transmission system may smoothly transition between the first and second gear ratios, if wanted, resulting in increased transmission efficiency and decreased NVH.

In another example, the first and second brake devices may be deactivated in the first gear ratio mode, preceding the transition between the first and second gear ratio modes. Consequently, the transmission system may operate more efficiently in the first gear ratio mode due to the lock-up clutches, in certain embodiments, consuming less energy while engaged than brake devices held in an activated state.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A transmission system in vehicle achieving a space efficient arrangement with at least three selectable gear ratios, is described herein. The transmission system includes three planetary gear sets with a first brake device and a first lock-up clutch coupled in parallel to a ring gear in a first planetary gear set. Using the brake device and lock-up clutch arranged in parallel in the system makes possible an increase in system space efficiency, in comparison to transmissions using bulkier friction clutches. Brake devices and lock-up clutches may be less costly than friction clutches, in certain cases. The system's manufacturing costs may therefore be reduced. The first lock-up clutch is designed to ground the ring gear to a fixed component during a first gear ratio mode.

Coordinated operation of the first brake device and lock-up clutch allows smoother shifts between active gear ratios to transpire, such as a shift between the first and second gear ratios. Put another way, in comparison to other transmissions deploying dog clutches, the system may exhibit decreased (e.g., substantially zero) power interruption when transitioning between active gears. The reduced power interruption brings about noise, vibration, and harshness (NVH) reductions and transmission efficiency gains. The transmission system may further include a second brake device as well as a second and third lock-up clutch. The second brake device may be designed to selectively ground a second ring gear in the second planetary gear set. The second lock-up clutch may be coupled to the second ring gear and a third ring gear in a third planetary gear set. The third lock-up clutch may be configured to selectively ground the third ring gear. Operation of these brakes and lock-up clutches may be coordinated when transitioning between the second gear ratio mode and a third gear ratio mode to decrease power flow losses. Consequently, transmission efficiency may be further increased and the chance of vehicle jerks occurring during shifting may be decreased. Using the lock-up clutches in combination with the brake devices allows the brake devices to be deactivated after a gearshift. Transmission energy efficiency may be further increased because the brakes may consume energy when held in an activated state while the lock-up clutches may consume little or no energy while engaged, in some implementations. Put another way, the duration of use of potentially higher energy consuming components in the transmission may be decreased, in some examples, increasing the transmission's energy efficiency.

Figure 1:
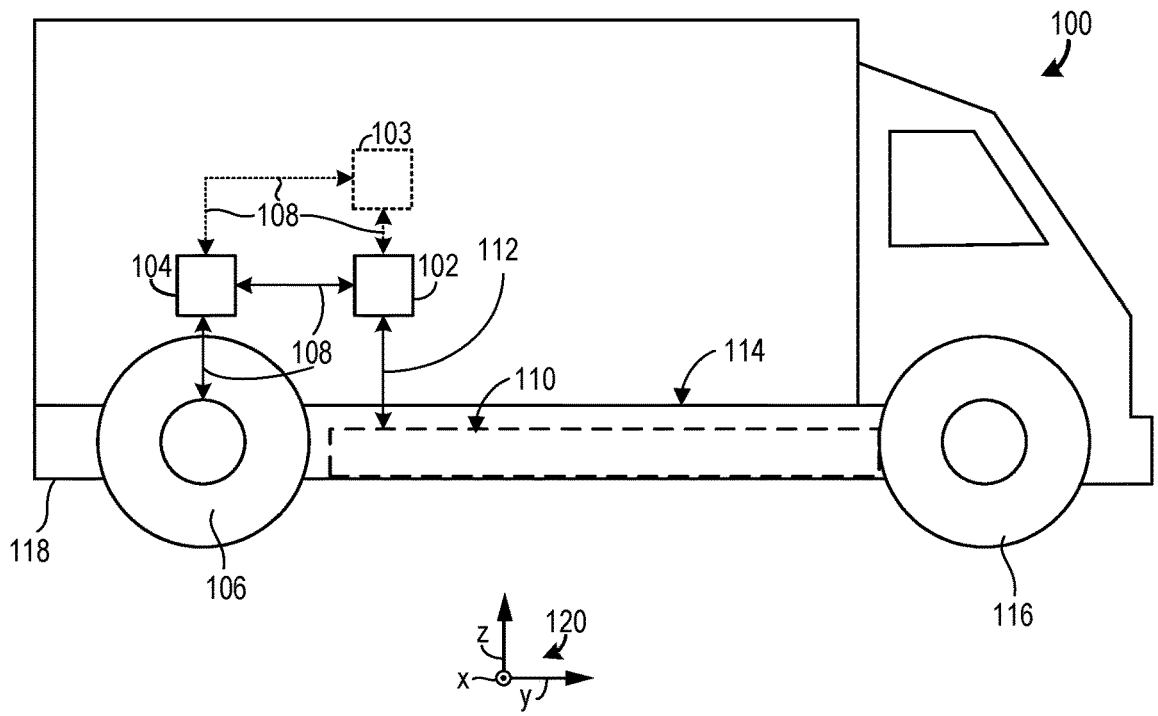
FIG. 1 shows a schematic representation of a vehicle including a transmission system.

Turning to FIG. 1, a vehicle 100 with an electric machine 102 (e.g., electric motor-generator) and/or a prime mover 103 (e.g., internal combustion engine) is illustrated. As such, the vehicle may be a battery electric vehicle (BEV), in one example, or a hybrid vehicle, in another example. The vehicle 100 may be a light, medium, or heavy duty vehicle such as a passenger vehicle, a commercial truck, a bus, a vocational vehicle, and the like.

The electric machine 102 delivers power to a transmission system 104. In turn, the transmission system 104 delivers power to drive wheels 106 of the vehicle. In the illustrated example, the drive wheels are the rear wheels. However, front and four-wheel drive vehicle configurations have been contemplated. Components such as a transmission shaft, differential, axle shafts, etc. may be used to transfer power from the transmission system 104 to the drive wheels 106, for example. The prime mover 103 may deliver power to the electric machine 102 for recharging a battery pack, as shown. Additionally or alternatively, the prime mover 103 may transfer power to the transmission system 104 or in some cases to drive wheels separate from the drive wheels 106 coupled to the transmission.

Figure 2:
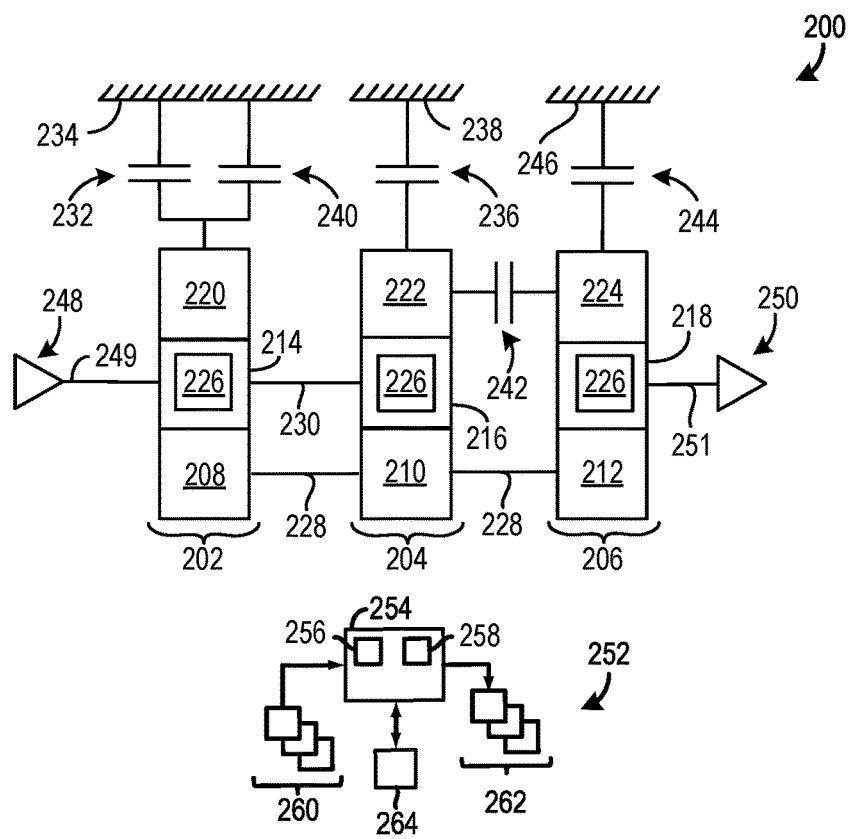
FIG. 2 shows an embodiment of a transmission system.
Figure 3:
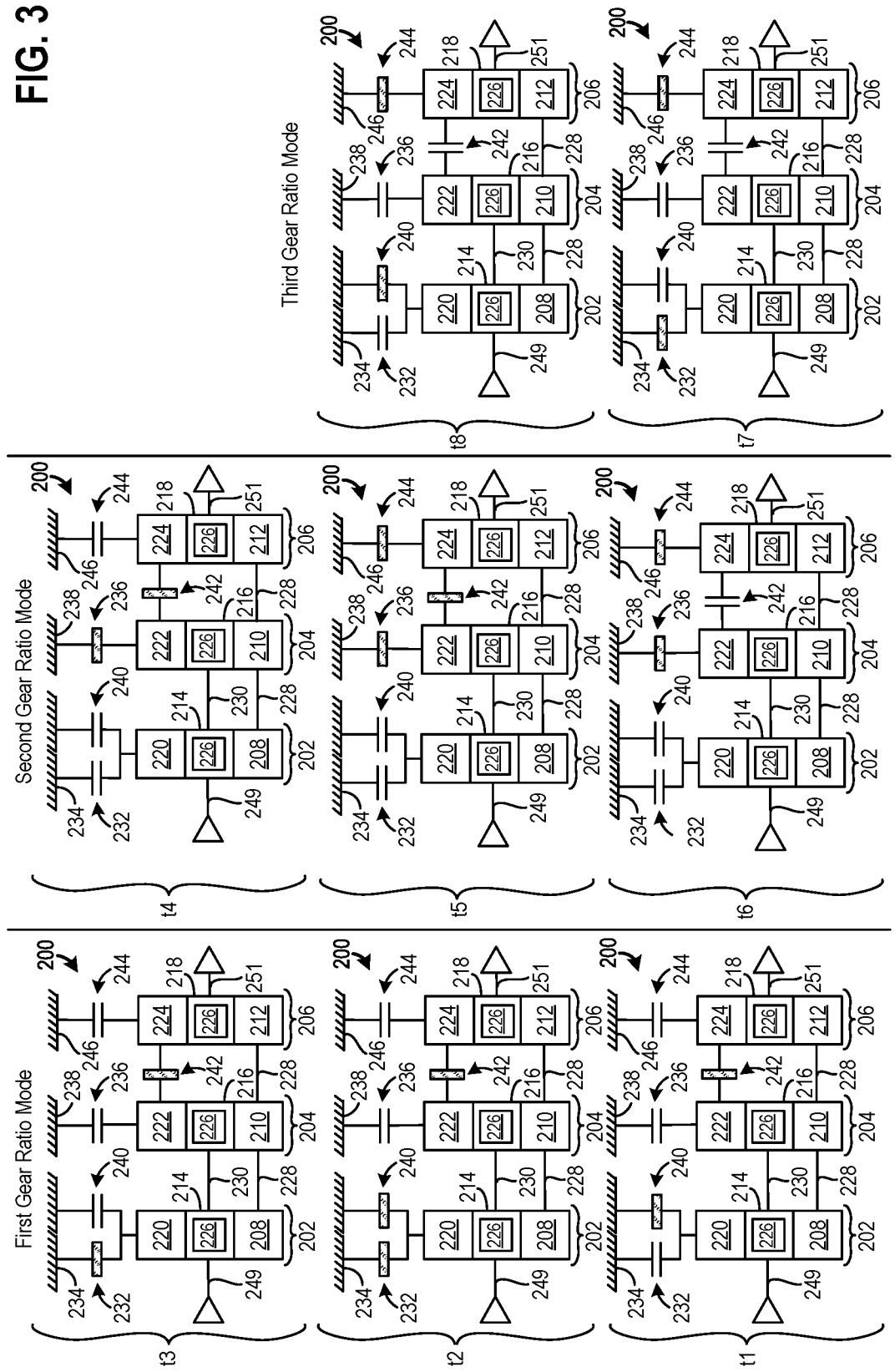
FIG. 3 illustrates a gearshift sequence in the transmission system, shown in FIG. 2.

The transmission system 104 is designed to operate in discrete gears, discussed in greater detail herein with regard to FIGS. 2-3. Arrows 108 denote the flow of power between the electric machine 102, the prime mover 103, the transmission system 104, and the drive wheels 106.

The vehicle 100 includes a battery pack 110 configured to deliver electrical power to various components of the electrical system of the vehicle 100. For instance, the battery pack 110 may supply current to the electric machine 102. Arrow 112 indicates the flow of electrical energy from the battery pack 110 to the electric machine 102. The battery pack 110 may extend along a chassis 114 of the vehicle 100, between the front wheels 116 and the rear wheels 106, along a portion of a length of the vehicle 100. A width of the battery pack 110 may be similar to a distance between innermost wheels of the rear wheels 106, in some cases.

In one example, the chassis 114 of the vehicle 100 may be a skateboard chassis in which the battery pack 110 is incorporated and forms a continuous unit therewith. In one particular example, the battery pack 110 may be embedded in the skateboard chassis 114. For instance, the battery pack may reside in a recess in the skateboard chassis 114, to form a single integrated structure, thus also incorporated into the floor of the vehicle 100. The skateboard chassis may extend along a greater portion of the length of the vehicle 100 than the battery pack 110, from a point behind the front wheels 116 to a rear end 118 of the vehicle. However, in other examples, the skateboard chassis may vary in length, e.g., the skateboard chassis 114 may be shorter than depicted in FIG. 1. The skateboard chassis 114 may be at least partially formed of a metal such as steel, aluminum, etc.

The skateboard chassis 114 may provide various benefits with respect to efficient assembly and packaging of the vehicle 100. For example, the skateboard chassis 114 may be readily scalable, allowing different types of vehicle bodies to be attached thereto. A low vertical (e.g., with respect to the z-axis) positioning of the battery pack 110 in the vehicle 100 lowers the vehicle's center of gravity to increase vehicle performance with respect to handling. Furthermore, locating the battery pack 110 in the vehicle floor may increase cabin space while enclosing the battery pack 110 in a durable, rigid structure that supports and shields the battery pack 110 from contact with debris, moving vehicle components, etc.

In addition, the battery pack 110 itself may be a strong, rigid structure and incorporating the battery pack 110 into the skateboard chassis 114 may further reinforce a structural integrity of the vehicle floor. By positioning the battery pack 110 at the bottom region of the skateboard chassis 114, the battery pack may be easily accessible for maintenance, repair, and replacement. As such, the battery pack 110 may be removably coupled to the skateboard chassis 114 and configured as a frame integrated independent sub-structure in the skateboard chassis 114. In other words, the battery pack 110 may form a distinct structure that is embedded into the skateboard chassis 114 but readily accessible and may be removed when desired.

Axis system 120 is illustrated in FIG. 1, for reference. The z-axis may be a vertical axis, the x-axis may be a lateral axis, and/or the y-axis may be a longitudinal axis, in one example. However, the axes may have other orientations, in other examples.

FIG. 2 depicts an embodiment of a transmission system 200. The transmission system 200 is an example of the transmission system 104, illustrated in FIG. 1, and therefore may be included in the vehicle 100.

The transmission system 200, as depicted, comprises a first, a second, and a third planetary gear set 202, 204, 206 including first, second, and third sun gears 208, 210, 212, respectively. The first, second, and third planetary gear sets 202, 204, 206 additionally include first, second, and third carriers 214, 216, 218, respectively, as well as first, second, and third ring gears 220, 222, and 224, respectively. In certain implementations, the system may include solely three planetary gear sets, to reduce system complexity. However, additional planetary gear sets may be added to the system, in some embodiments. As described herein, a gear is a component with teeth designed to form a mesh with gears to which it is directly coupled.

The first, second, and third carriers 214, 216, 218, may each include a plurality of planet gears 226. The planet gears may be conceptually divided into a first, second, and third set of planet gears in the first, second, and third planetary gear sets 202, 204, 206, respectively. The size of the planet gears may vary from carrier to carrier, in one example. Likewise, the size of the sun gears in each planet gear set may vary but the size of the ring gears may be substantially equivalent, in such an example. In this way, the first, second, and third planetary gear sets may achieve desired gear ratios. In an alternate example, the sun and planet gears in at least two of the planetary gear sets may have a similar size. Transmission embodiments where the size of the ring gears varies have been envisioned, which may however increase manufacturing complexity. The sun gears 208, 210, 212 and the planet gears 226 may each include bearings supporting and enabling rotation of the corresponding gear. The bearing therefore may include conventional components such as races, roller elements (e.g., balls, cylindrical rollers, tapered rollers, etc.), and the like.

The first, second, and third sun gears 208, 210, 212 are rotationally coupled in series via shafts 228. Thus, the axes of rotation of the sun gear may be aligned. Additionally, in the depicted embodiment, a shaft 230 rotationally couples the first carrier 214 to the second carrier 216. However, other carrier coupling schemes have been envisioned.

Additionally, the transmission system 200 includes a first brake device 232 coupled to the first ring gear 220 and a fixed component 234 and a second brake device 236 coupled to the second ring gear 222 and a fixed component 238. The fixed components 234, 238, 246 may be one or more components such as a transmission casing, vehicle frame, motor housing, and the like. The first and second brake devices 232, 236 are configured to transmit torque between a rotatable component (i.e., the gear to which they are attached) and a fixed component (e.g., a transmission casing, vehicle frame, motor housing, etc.) and vary the torque transmission. Put another way, the first and second brake devices 232, 236 are designed to selectively ground the first and second ring gears 220, 222, respectively. To elaborate, the first and second brake devices 232, 236 are configured to activate or deactivate to initiate or suspend the torque transmission. The selective grounding may include grounding of the corresponding ring gear during some periods and releasing the gear grounding during other periods. While activated, torque is transmitted through the brake devices to the fixed component. The amount of torque transmission during brake activation may be continuously adjustable. Conversely, while deactivated, this torque transmission is prevented. Brake activation may lead to heat build-up in the system, sometimes decreasing brake efficiency and, in some cases, brake actuator efficiency. System control strategies aimed at increasing system efficiency and decreasing heat build-up may be deployed and are described in greater detail herein with regard to FIGS. 3-5.

Continuing with FIG. 2, the first and second brake devices 232, 236 may take several forms such as braking mechanisms with friction plates (e.g., disc packs) that are pressed together during brake activation, drum brake devices using radially engaged brake shoes, eddy current braking mechanisms, electromagnetic braking mechanisms, and the like. The first and second brake devices 232, 236 may be hydraulically, pneumatically, and/or electromechanically actuated. For instance, a hydraulic piston may actuate the first and/or second brake devices 232, 236, in one example, or an electromagnetic device (e.g., a linear solenoid) may actuate the first and/or second brake device, in another example. Further, in one example, the first and second brake devices 232, 236 may be the only brake devices in the transmission system 200. Providing solely two brake devices in the system decreases system cost and complexity in a three-speed transmission when compared to systems using additional brake devices and/or friction clutches.

The transmission system 200 further includes a first lock-up clutch 240 coupled to the first ring gear 220 and the first fixed component 234, and may include a second lock-up clutch 242 coupled to the second and third ring gears 222 and 224, respectively. In some implementations, the transmission system 200 may include a third lock-up clutch 244 coupled to third ring gear 224 and a fixed component 246. The fixed components 234, 238, 246 may be a common component, in one example, or may be distinct components, in other examples. For instance, the ring gears may each be coupled to a transmission casing, vehicle frame, or motor housing. However, in other instances, at least a portion of the ring gears may be coupled to different fixed components.

Figure 6:
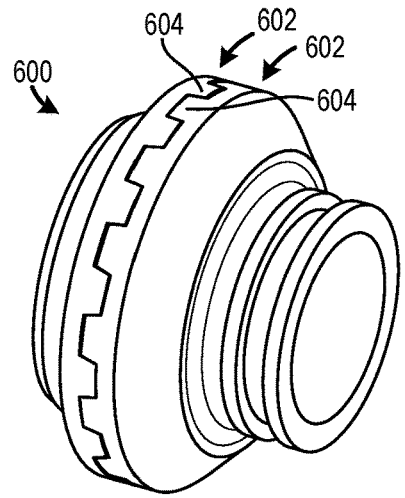
FIG. 6 shows an embodiment of a dog clutch.

The first, second, and third lock-up clutches, 240, 242, and 244 are configured to engage selectively. To elaborate, the lock-up clutches may be placed in an engaged or disengaged configuration. In the engaged configuration the clutches transfer torque between the components to which they are attached. Conversely, in the disengaged configuration, the torque transfer between the components to which the clutches are attached ceases. In one embodiment, the first, second, and third lock-up clutches 240, 242, and 244, may be dog clutches with multiple faces having teeth. FIG. 6 shows an exemplary embodiment of a dog clutch 600 having faces 602 with teeth 604 that are mated when engaged. Thus, in such an embodiment, the toothed faces mate with one another during clutch engagement and are decoupled during clutch disengagement. In alternate embodiments, the dog clutches may be splined dog clutches. In further embodiments, other locking mechanisms may be used in the lock-up clutches such as actively controlled latching or ratcheting mechanisms. However, dog clutches may have a space efficient profile and design that may suit the transmission arrangement described herein.

Continuing with FIG. 2, the first and third lock-up clutches 240, 244 are designed to selectively ground the first and third ring gears 220, 224, to the fixed components 234 and 246, respectively. The grounding of the ring gears via the clutches allows the transmission to be placed in discrete gear ratios, described in greater detail herein with regard to FIG. 3.

Additionally, in certain embodiments, one or two of the lock-up clutches 240, 242, 244 may be held in an engaged state in a selected gear ratio mode. For instance, the first and second lock-up clutches 240, 242 may each be held in an engaged configuration while the transmission operates in a first gear ratio mode. When one of the lock-up clutches is held in an engaged state, it may use less energy than holding one of the brake devices 232, 236 in an activated state. Specifically, in some cases, the lock-up clutches 240, 242, 244 may consume little or no energy when engagement of one or more of the clutches is sustained in different operating modes while sustaining activation of the first or second brake devices 232, 236 may consume a greater amount of energy in the operating modes. Therefore, the transmission control schemes, described in greater detail herein, may deactivate the brake devices during selected periods (e.g., steady state gear operation) to increase transmission efficiency. Using the lock-up clutches in the transmission system allows the complexity and, in some cases, the cost of the system to be reduced in comparison to systems using additional brakes and/or friction clutches, which in certain circumstances may be more complex and costly. The use of lock-up clutches as opposed to additional brakes and/or bulkier friction clutches may also increase the system's packaging efficiency.

In the embodiment illustrated in FIG. 2, the transmission system 200 receives rotational input from an upstream device, indicated at 248, such as the electric machine 102 illustrated in FIG. 1, via a shaft 249 coupled to the first carrier 214. Conversely, the transmission system 200 transfers rotational output to a downstream device (e.g., drive shaft, differential, etc.), indicated at 250, via a shaft 251 coupled to the third carrier 218, in the illustrated embodiment.

In an alternate example, the transmission may exhibit a configuration where the ring gears 220, 222, and 224 are coupled in series, similar to the arrangement of the sun gears in the embodiment depicted in FIG. 2. Continuing with such an example, the first brake device 232 and the first lock-up clutch 240 may be designed to selectively ground the sun gear 208. Further in this example, the second brake device 236 may be configured to selectively ground the second sun gear 210 and the third lock-up clutch 244 may be configured to selectively ground the third sun gear 212. Additionally, in this example, the second lock-up clutch 242 may be configured to engage and disengage the rotational connection between the second and third sun gears 210, 212.

A control system 252 with a controller 254 may be included in the transmission system 200. The controller 254 may include a processor 256 and memory 258. The memory 258 may hold instructions stored therein that, when executed by the processor 256, cause the controller 254 to perform the various methods, control techniques, etc., described herein. The processor 256 may include a microprocessor unit and/or other types of circuits. The memory 258 may include known data storage mediums such as random access memory, read only memory, keep alive memory, combinations thereof, etc. Furthermore, it will be understood that the memory 258 may include non-transitory memory.

The controller 254 may receive signals from sensors 260 positioned in various locations in the transmission system 200. The sensors may include an electric machine speed sensor, an energy storage device temperature sensor, an energy storage device state of charge sensor, clutch position sensors, wheel speed sensors, etc. The controller 254 may additionally send control signals to various actuators 262 positioned at different locations in the transmission system 200. For instance, the controller 254 may send signals to actuators of the first or second brake devices 232, 236, or to other components such as the lock-up clutches 240, 242, 244. Thus, the other controllable components in the transmission system may similarly function with regard to command signals and actuator adjustment. The controller 254 may send commands to other vehicle components, such as components in the vehicle 100, illustrated in FIG. 1.

The controller 254 may be configured to automatically operate the transmission system 200, in some implementations. For instance, the controller 254 may transition between gear ratio modes (e.g., three gear ratio modes) based on vehicle speed, vehicle load, and/or other operating conditions. For instance, when the vehicle speed and/or load surpasses a threshold value, the transmission may be automatically shifted from a first gear ratio mode to a second gear ratio mode. In such an example, the transmission system may be referred to as an automatic transmission system. Additionally, the controller 254 may be coupled to an input device 264 (e.g., a gear selector such as a gear stick, a gear lever, etc., a console instrument panel, a touch interface, a touch panel, a keyboard, combinations thereof, etc.). The input device 264, responsive to driver input, may generate a mode request indicating a desired operating mode for the transmission. For instance, in a use-case example, the driver may shift a gear selector into an operating mode (e.g., drive mode or reverse mode) to generate a gear change request at the controller 254. In response, the controller 254 commands the transmission components to initiate a transition into the selected operating mode.

FIG. 3 shows the transmission system 200 operating in active gears and transitioning between the active gears in an example operational sequence. The active gears are referred to as a first, a second, and a third gear ratio mode, denoted via separate columns. In each of the gear ratio modes, the transmission system operates in a distinct gear ratio. Control of the lock-up clutches and brake devices is coordinated in FIG. 3 for smoother torque transfer during gearshifts. Points in time, corresponding to distinct system states, are sequentially indicated from t1-t8. The three gear ratio modes shown in FIG. 3 may be used for both forward and reverse vehicle operation, in one example. To elaborate, an electric machine coupled to the transmission may be operated in rotational directions corresponding to forward and reverse vehicle drive. It will be further appreciated that an electric machine, coupled to transmission, may be operated in a regenerative mode while the transmission is in the first, second, or third gear ratios modes.

The transmission system 200 in the states shown in FIG. 3 include similar components to the transmission system 200, shown in FIG. 2, that are similarly numbered. Redundant description of the system component is omitted for brevity. Additionally in FIG. 3, cross-hatched boxes are used to infer activated brake devices and engaged lock-up clutches. Conversely, the absence of the cross-hatched boxes infers deactivated brake devices and disengaged lock-up clutches.

At t1, the transmission system 200 operates in the first gear ratio mode, preceding gearshift operation. In the first gear ratio mode, prior to a gearshift transition, the first lock-up clutch 240 is engaged, holding the first ring gear 220 stationary with respect to the fixed component 234. Thus, in the first gear ratio mode, at t1, the first ring gear 220 is grounded via the first lock-up clutch 240. Further, at t1, the second lock-up clutch 242 is engaged. Thus, at t1, power flows into the transmission via the first carrier 214 and out of the transmission via the third carrier 218 while the first ring gear 220 is grounded and the second and third ring gears 222, 224 rotate to maintain the transmission in the first gear ratio mode.

At t1, the first and second brake devices 232, 236 are deactivated. Because activated brakes may consume energy, deactivating the first and second brake devices 232, 236 may increase transmission efficiency in the first gear ratio mode. To elaborate, holding the first lock-up clutch 240 in an engaged state while in the first gear ratio mode may use comparatively less energy than activating the first brake device 232 to ground the first ring gear in the first gear ratio. The transmission system 200 therefore achieves efficiency gains when deactivating the brake devices in the first gear ratio mode, in some implementations. Deactivation of the first and second brake devices 232, 236 also may confer less wear to the brake devices. Alternatively, in other embodiments, the first brake device 232 may be activated in the first gear ratio mode at t1, which may decrease transmission efficiency.

From t2, to t3, the transmission system 200 is prepared for a shift between the first gear ratio mode and the second gear ratio mode. At t2, the first brake device 232 is activated, while the first and second lock-up clutches 240, 242 remain engaged. In this way, the first brake device 232 and the first lock-up clutch 240 ground the first ring gear 220 in parallel, maintaining the transmission in the first gear ratio.

At t3, the first lock-up clutch 240 is disengaged while the first brake device 232 remains activated and grounds the first ring gear 220. Thus, the first ring gear 220 remains grounded while the first lock-up clutch is released, readying the transmission for the gearshift between the first and second gear ratio modes.

From t3 to t4, the transmission system 200 transitions between the first and second gear ratio modes via deactivation of the first brake device 232 and activation of the second brake device 236 at overlapping times. To expound, brake force applied by the first brake device 232 is decreased to unground the first ring gear 220 and brake force applied by the second brake device 236 is increased, leading to the grounding of the second ring gear 222 at t4. The degree of brake torque release and ramp-up in the first and second brake devices 232, 236, respectively, may be modulated to enable a smoother gearshift with a decreased amount (e.g., relatively little) power interruption to take place, if desired. Put another way, torque may be smoothly transferred between the first and second brake devices 232, 236 when the transmission shift between the first and second gear ratios to allow the transmission to sustain the delivery of power to downstream components with relatively little or no interruption, if wanted. Consequently, NVH in the transmission system may be reduced and transmission efficiency may be increased. For instance, the amount of vehicle jerk perceived by a driver, passengers, etc. may be reduced.

At t4, the engagement of the second lock-up clutch 242 and the disengagement of the first and third lock-up clutches 240, 244 are sustained. Thus, the second and third ring gears 222, 224 are grounded while the first ring gear 220 is allowed in the second gear ratio mode depicted at t4.

At t5, the third lock-up clutch 244 is engaged while engagement of the second lock-up clutch 242 and activation of the second brake device 236 are sustained. Alternatively, in one example, in the second gear ratio mode at t5, the second brake device 236 may be deactivated. In this way, the clutch configuration is varied to keep the second and third ring gears 222, 224 grounded while releasing the second brake device 236. The transmission's energy efficiency may be consequently increased, owing to the second brake device's energy consumption in an activated state, in certain cases.

At t6, the transmission system 200 is prepared for a gearshift between the second gear ratio and the third gear ratio where the second lock-up clutch 242 is disengaged. Further, at t6, engagement of the third lock-up clutch 244 and activation of the second brake device 236 persists.

From t6 to t7, the transmission system 200 transitions between the second and third gear ratio modes. To accomplish this transition, the first brake device 232 is activated while the second brake device 236 is released to shift between the second and third gear ratio. In the third gear ratio mode at t7, the first ring gear 220 and the third ring gear 224 are grounded to achieve the selected gear ratio.

At t8, the third gear ratio mode is maintained but the first lock-up clutch 240 is engaged while the first brake device 232 is deactivated. Due to the parallel arrangement between the first lock-up clutch 240 and the first brake device 232, this coordinated operation of the clutch and the brake allows grounding of the first ring gear 220 to persist. The release of the first brake device 232, in the third gear ratio mode, may increase system efficiency because the first brake device may consume energy while remaining activated.

Figure 4:
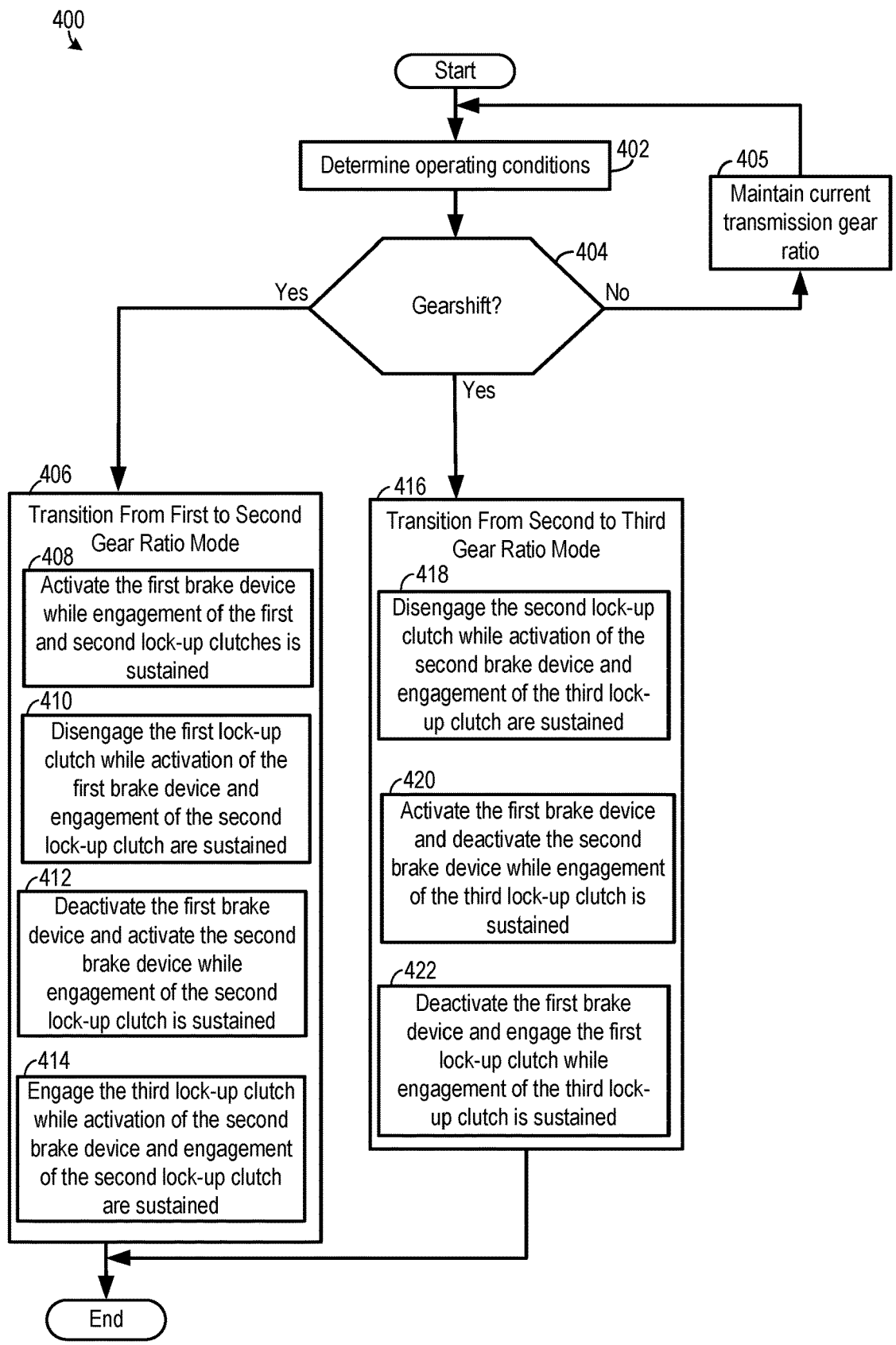
FIG. 4 illustrates a method for operation of a transmission system.

Referring to FIG. 4, a method 400 for operating a transmission system is shown. It will be understood, that the method 400 may be implemented via the vehicle, transmission systems, system components (e.g., controller, actuators, sensors, etc.), etc., described above with regard to FIGS. 1-3 and 6. However, in other examples, the method 400 may be implemented by other suitable transmission systems, components, etc. Furthermore, method 400 may be stored as instructions in non-transitory memory of a controller, such as the controller 254, shown in FIG. 2.

At 402, the method includes determining operating conditions. The operating conditions may include but are not limited to vehicle speed, vehicle load, electric machine speed, electric machine temperature, ambient temperature, input device state (e.g., gear selector position), and the like.

Next at 404, the method determines whether or not to implement a gearshift between two gear ratios. In one implementation, the transmission may automatically initiate a gearshift based on operating conditions such as vehicle speed and/or vehicle loads. In another implementation, driver initiated shifts may occur where the driver selects a gear ratio via a gear selector. If a gearshift is not initiated (NO at 404) the method proceeds to 405 where the method includes maintaining the transmission in its current gear ratio. Thus, at 405, the state of the transmission clutches and brakes may persist.

On the other hand, if a gearshift has been initiated (YES at 404) the methods moves to step 406 or 416 depending on operating conditions such as vehicle speed, vehicle load, gear selector position, etc. for instance. For example, the method may move to step 406 when the vehicle speed surpasses a first threshold value triggering a gearshift from first to second gear. In such an example, the method may move to step 416 when the vehicle speed surpasses a second threshold value, greater than the first threshold value, triggering a gearshift from second to third gear. Additionally or alternatively, vehicle load may be used to trigger a shift between the gear ratios. For instance, if the vehicle load surpasses a first threshold value the method may move to 406 and if the vehicle speed surpasses a second threshold value, greater than the first threshold value, the method may advance to 416. In other examples, the method may move to step 406 when a gear selector is moved into a second gear position from a first gear position and the method may advance to step 416 when the gear selector is moved into a third gear position from the second gear position. It will be appreciated that although the method illustrates upshifts between gears at 406 and 416, the downshifts between these gears may occur in the reverse order.

At 406, the method includes transitioning from the first to the second gear ratio mode. Transitioning between the first and second gear ratio modes includes steps 408, 410, 412, and 414. Specifically, at 408, the method includes activating the first brake device while engagement of the first and second lock-up clutches is sustained. Next at 410, the method includes disengaging the first lock-up clutch while activation of the first brake device and engagement of the second lock-up clutch are sustained.

At 412, the method includes deactivating the first brake device and activating the second brake device while engagement of the second lock-up clutch is sustained. Coordinating activation and deactivation of the brake devices in this manner may allow a smoother shift between the first and second gear ratios to occur. This smooth gearshift may reduce NVH and increase transmission efficiency. At 414, the method includes engaging the third lock-up clutch while sustaining activation of the second brake device and engagement of the second lock-up clutch. In an alternate example, the second brake device may be deactivated at step 414 while engagement of the second and third lock-up clutches persists. Consequently, transmission energy efficiency may be decreased in embodiments where the second brake device consumes power while remaining activated.

At 416, the method includes transitioning from the second to the third gear ratio. Transitioning between the second and third gear ratios includes steps 418, 420, and 422. At 418, the method includes disengaging the second lock-up clutch while activation of the second brake device and engagement of the third lock-up clutch are sustained. In this way, the transmission is readied for the gearshift.

At 420, the method includes activating the first brake device and deactivating the second brake device while engagement of the third lock-up clutch is sustained. Consequently, the transmission shifts from the second to the third gear ratio with torque transferred between the brakes.

At 422, the method includes deactivating the first brake device and engaging the first lock-up clutch while engagement of the third lock-up clutch is sustained. Method 400 allows lock-up clutch and brake device control to be coordinated to allow the transmission to remain in a gear using selected lock-up clutches and smoothly shift gears using overlapping brake modulation. Thus, the transmission's efficiency may be increased while achieving gearshifts with relatively little power interruption, if desired.

Figure 5:
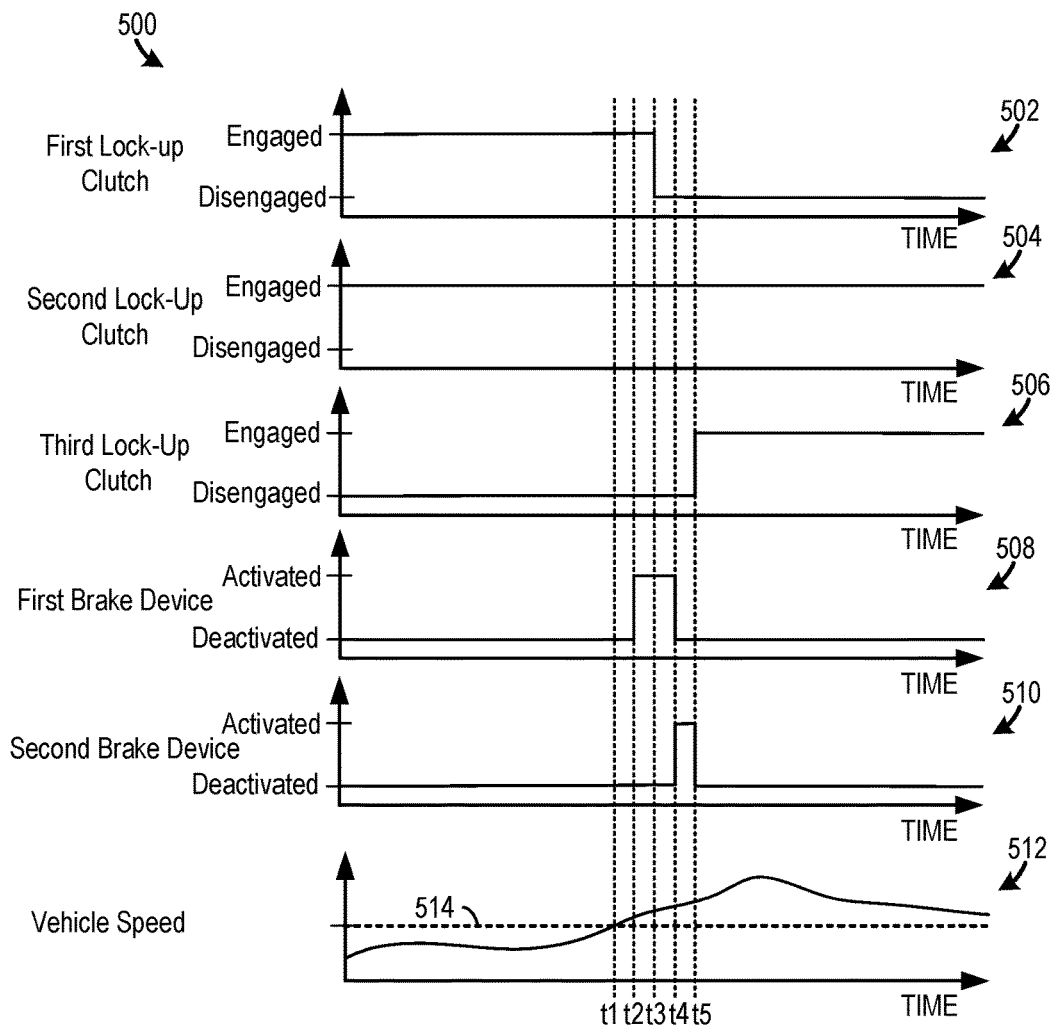
FIG. 5 illustrates a timing diagram of a use-case gearshift sequence in a transmission system.

FIG. 5 illustrates a prophetic use-case operating scheme for a transmission system, such as the transmissions system 200, shown in FIGS. 2-3. Diagram 500 shows a series of plots 502, 504, and 506, depicting the states of the first, second, and third lock-up clutches, respectively. Further, diagram 500 shows plots 508 and 510 depicting the states of the first and second brake devices, respectively. Additionally, diagram 500 shows plot 512 with vehicle speed on the ordinate. The plots shown in FIG. 5 occur at the same time and are aligned in time. The operational states ("Engaged" and "Disengaged") of the corresponding lock-up clutch are presented on the ordinates for plots 502, 504, and 506. The operational states ("Activated" and "Deactivated") of the corresponding brake device are presented on the ordinates of plots 508 and 510. It will be appreciated that the specific control schemes for the brake devices may be more nuanced, in practice. For instance, brake activation may include increasing brake torque until the brake is grounded and brake deactivation may include decreasing brake torque to unground the brake device. In each plot, time is indicated on the abscissa, increasing from left to right. The vertical dashed lines at t1, t2, t3, t4, and t5 indicate relative points of interest in time.

Prior to t1, the transmission is operating in the first gear ratio mode. Accordingly, the first and second lock-up clutches are engaged, the third lock-up clutch is disengaged, and the first and second brake devices are deactivated.

At time t1, vehicle speed surpasses a threshold value 514. Responsive to the vehicle speed surpassing the threshold value, a transmission shifting sequence is initiated. However, as previously discussed, operating conditions such as vehicle load and/or gear selector position may be used to initiate a gearshift sequence. At t2, the first brake device is activated while the first lock-up clutch remains engaged. Next, at time t3, the first lock-up clutch is disengaged while the first brake device remains engaged.

At t4, the transmission transitions into the second gear ratio mode from the first gear ratio. During the gearshift between the first and second gear ratio mode the first brake device is deactivated while the second brake device is activated. Thus, brake control may be coordinated to transfer torque from the first brake device to the second brake device. In this way, the gearshift may unfold with relatively little power interruption, if wanted. At t5, the transmission remains in the second gear. The third clutch is engaged to hold the transmission in second gear ratio, and the second brake device is deactivated to increase transmission efficiency. However, in other examples, the second brake device may remain activated at t5 which may decrease transmission efficiency. The shifting sequence from the second gear ratio mode back to the first gear ratio mode occur in the opposite sequence. Additionally, the transmission may be shifted from the second gear ratio mode to the third gear ratio mode using a vehicle speed threshold greater than the threshold value 514. The shifting sequence between the second and third gear ratio modes may unfold in a manner similar to the lock-up clutch and brake control strategy previously described with regard to t6, t7, and t8, shown in FIG. 3.

The systems and methods described herein have the technical effect of allowing a smoother flow of power during shifting transients to unfold in the transmission. This reduction (e.g., avoidance) of power interruption during a gear ratio transition may reduce NVH such as driver perceived jerks and increase system efficiency. Additionally, the use of lock-up clutches in the system to hold the transmission in gear, may increase the system's energy efficiency as compared to transmissions using brakes or friction clutches.

FIGS. 1-3 and 6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. As used herein, the term "substantially" is construed to mean plus or minus five percent of the range unless otherwise specified.

The invention will be further described in the following paragraphs. In one aspect, a transmission system is provided that comprises a first planetary gear set comprising a first ring gear and a first sun gear; a second planetary gear set comprising a second ring gear and a second sun gear; a third planetary gear set comprising a third ring gear and a third sun gear; a first brake device configured to selectively ground the first ring gear or the first sun gear; a second brake device configured to selectively ground the second ring gear or the second sun gear; and a first lock-up clutch configured to selectively ground the first ring gear; wherein the first, second, and third sun gears or the first, second, and third ring gears are coupled in series.

In another aspect, a method for operation of a transmission system in a vehicle is provided that comprises: executing a first coordinated operation of a first brake device and a first lock-up clutch coupled to a first ring gear in a first planetary gear set to transition the transmission system between a first gear ratio mode and a second gear ratio mode, wherein the first brake device and the first lock-up clutch ground the first ring gear in parallel during the first coordinated operation; wherein the transmission system comprises: the first planetary gear set; a second planetary gear set including a second ring gear; and a third planetary gear set including a third ring gear; wherein sun gears of the first, second, and third planetary gear sets are coupled in series. In one example, the method may further comprise executing a second coordinated operation of a second brake device, a second lock-up clutch, and a third lock-up clutch to transition the transmission system between a second gear ratio mode and a third gear ratio mode; wherein the first brake device is coupled to a first fixed component; and wherein, during the second coordinated operation, the second brake device selectively grounds the second ring gear, the second lock-up clutch is selectively coupled to the second ring gear and the third ring gear, and the third lock-up clutch selectively grounds the third ring gear. In yet another example, the method may further comprise deactivating the first brake device when the transmission system is operating in the first gear ratio mode and deactivating the second brake device when the transmission system is operating in the second or third gear ratio mode.

In yet another aspect, an automatic transmission system is provided that comprises a first planetary gear set comprising a first ring gear and a first sun gear; a second planetary gear set coupled to the first planetary gear set and comprising a second ring gear and a second sun gear; a third planetary gear set coupled to the second planetary gear set and comprising a third ring gear and a third sun gear; a first brake device configured to selectively ground the first ring gear; a second brake device configured to selectively ground the first ring gear; a first lock-up clutch configured to selectively ground the first ring gear in parallel with the first brake device; and a controller including executable instructions stored in non-transitory memory that cause the controller to: coordinate operation of the first lock-up clutch, the first brake device, and the second brake device to transition the automatic transmission system between a first gear ratio mode and a second gear ratio mode.

In any of the aspects or combinations of the aspects, the transmission system may further comprise a second lock-up clutch coupled to the first ring gear and the second ring gear; and a controller including executable instructions stored in non-transitory memory that cause the controller to: coordinate operation of the first lock-up clutch, the second lock-up clutch, the first brake device, and the second brake device to transition the transmission system between a first gear ratio mode and a second gear ratio mode.

In any of the aspects or combinations of the aspects, the controller may include executable instructions stored in non-transitory memory that, during operation of the transmission system in the first gear ratio mode, cause the controller to: deactivate the first brake device; and wherein the controller may include executable instructions stored in the non-transitory memory that, during operation of the transmission system in the second gear ratio mode, cause the controller to: deactivate the second brake device.

In any of the aspects or combinations of the aspects, the second lock-up clutch may be configured to selectively couple the second ring gear to the third ring gear.

In any of the aspects or combinations of the aspects, the transmission system may further comprise a third lock-up clutch configured to selectively ground the third ring gear.

In any of the aspects or combinations of the aspects, the first, second, and third lock-up clutches may be dog clutches.

In any of the aspects or combinations of the aspects, the transmission system may further comprise a controller including executable instructions stored in non-transitory memory that cause the controller to: coordinate operation of the second brake device, the second lock-up clutch, and the third lock-up clutch to transition the transmission system between a second gear ratio mode and a third gear ratio mode.

In any of the aspects or combinations of the aspects, the first planetary gear set may further comprise a first carrier with a first set of planet gears coupled to the first ring gear and the first sun gear; the second planetary gear set may further comprise a second carrier with a second set of planet gears coupled to the second ring gear and the second sun gear; and the third planetary gear set further comprises a third carrier with a third set of planet gears coupled to the third ring gear and the third sun gear; and the first carrier is directly coupled to the second carrier.

In any of the aspects or combinations of the aspects, the transmission system may be included in a battery electric vehicle (BEV).

In any of the aspects or combinations of the aspects, the first and second brake devices may be the only brake devices in the transmission system and the first lock-up clutch is a dog clutch.

In any of the aspects or combinations of the aspects, the transmission system may further comprise a second lock-up clutch configured to selectively couple the second ring gear and the third ring gear; and a third lock-up clutch configured to selectively ground the third ring gear.

In any of the aspects or combinations of the aspects, the first and second brake devices may be the only brake devices in the automatic transmission system and the first, second, and third lock-up clutches may be the only clutches in the automatic transmission system.

In any of the aspects or combinations of the aspects, the controller may include executable instructions stored in the non-transitory memory that, during operation of the automatic transmission system in the first gear ratio mode, cause the controller to: deactivate the first brake device; and wherein the controller may include executable instructions stored in the non-transitory memory that, during operation of the automatic transmission system in the second gear ratio mode, cause the controller to: deactivate the second brake device.

In any of the aspects or combinations of the aspects, the controller may include executable instructions stored in the non-transitory memory that cause the controller to: coordinate operation of the second brake device, the second lock-up clutch, and the third lock-up clutch to transition the automatic transmission system between the second gear ratio mode and the third gear ratio mode.

In any of the aspects or combinations of the aspects, the first planetary gear set may receive rotational input from an electric machine and the electric machine is electrically coupled to a battery pack incorporated in a vehicle chassis.

In another representation, an automatic transmission is provided that may comprise a dog clutch and a friction brake coupled in parallel to a ring gear of a first planetary gear set, wherein the first planetary gear set includes a sun gear coupled in series with sun gears of a second and a third planetary gear set and wherein during a steady state operating condition, the dog clutch holds the automatic transmission in a first gear while the friction brake is deactivated.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various transmission and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system, comprising:
 a first planetary gear set comprising a first ring gear and a first sun gear;
 a second planetary gear set comprising a second ring gear and a second sun gear;
 a third planetary gear set comprising a third ring gear and a third sun gear;
 a first brake device configured to selectively ground the first ring gear;
 a second brake device configured to selectively ground the second ring gear, wherein the first and second brake devices are the only brake devices in the transmission system comprising friction plates or drum brakes; and
 a first dog clutch configured to selectively ground the first ring gear, the first dog clutch comprising multiple faces having teeth;
 wherein the first, second, and third sun gears are coupled in series.

2. The transmission system of claim 1, further comprising:
 a second dog clutch coupled to the second ring gear; and
 a controller including executable instructions stored in non-transitory memory that cause the controller to:
  coordinate operation of the first dog clutch, the second dog clutch, the first brake device, and the second brake device to transition the transmission system between a first gear ratio mode and a second gear ratio mode.

3. The transmission system of claim 2, wherein the controller includes executable instructions stored in non-transitory memory that, during operation of the transmission system in the first gear ratio mode, cause the controller to:
 deactivate the first brake device; and
 wherein the controller includes executable instructions stored in the non-transitory memory that, during operation of the transmission system in the second gear ratio mode, cause the controller to:
  deactivate the second brake device.

4. The transmission system of claim 2, wherein the second dog clutch is configured to selectively couple the second ring gear to the third ring gear.

5. The transmission system of claim 4, further comprising a third dog clutch configured to selectively ground the third ring gear.

6. The transmission system of claim 5, wherein the controller includes executable instructions stored in the non-transitory memory that cause the controller to:
 coordinate operation of the second brake device, the second dog clutch, and the third dog clutch to transition the transmission system between the second gear ratio mode and a third gear ratio mode.

7. The transmission system of claim 1, wherein:
the first planetary gear set further comprises a first carrier with a first set of planet gears coupled to the first ring gear and the first sun gear;
the second planetary gear set further comprises a second carrier with a second set of planet gears coupled to the second ring gear and the second sun gear;
the third planetary gear set further comprises a third carrier with a third set of planet gears coupled to the third ring gear and the third sun gear; and
the first carrier is directly coupled to the second carrier.

8. The transmission system of claim 1, wherein the transmission system is included in a battery electric vehicle (BEV).

9. A method for operation of a transmission system in a vehicle, comprising:
executing a first coordinated operation of a first brake device and a first dog clutch coupled to a first ring gear in a first planetary gear set to transition the transmission system between a first gear ratio mode and a second gear ratio mode, wherein the first brake device and the first dog clutch ground the first ring gear in parallel during the coordinated operation;
wherein the transmission system comprises:
the first planetary gear set;
a second planetary gear set including a second ring gear; and
a third planetary gear set including a third ring gear;
wherein sun gears of the first, second, and third planetary gear sets are coupled in series;
executing a second coordinated operation of a second brake device, a second dog clutch, and a third dog clutch to transition the transmission system between the second gear ratio mode and a third gear ratio mode;
wherein the first brake device is coupled to a first fixed component; and
wherein, during the second executed coordinated operation, the second brake device selectively grounds the second ring gear, the second dog clutch is selectively coupled to the second ring gear and the third ring gear, and the third dog clutch selectively grounds the third ring gear; and
deactivating the first brake device when the transmission system is operating in the first gear ratio mode and deactivating the second brake device when the transmission system is operating in the second or third gear ratio mode.

10. The method of claim 9, wherein the first and second brake devices are the only brake devices in the transmission system comprising friction plates or drum brakes.

11. An automatic transmission system, comprising:
a first planetary gear set comprising a first ring gear and a first sun gear;
a second planetary gear set coupled to the first planetary gear set and comprising a second ring gear and a second sun gear;
a third planetary gear set coupled to the second planetary gear set and comprising a third ring gear and a third sun gear;
a first brake device configured to selectively ground the first ring gear;
a second brake device configured to selectively ground the second ring gear; a first dog clutch comprising multiple faces having teeth and configured to selectively ground the first ring gear in parallel with the first brake device, wherein the first brake device and the second brake device are the only brake devices of the automatic transmission system comprising friction plate or drum brakes; and
a controller including executable instructions stored in non-transitory memory that cause the controller to:
coordinate operation of the first dog clutch, the first brake device, and the second brake device to transition the automatic transmission system between a first gear ratio mode and a second gear ratio mode.

12. The automatic transmission system of claim 11, further comprising:
a second dog clutch configured to selectively couple the second ring gear and the third ring gear; and
a third dog clutch configured to selectively ground the third ring gear.

13. The automatic transmission system of claim 12, wherein the first and second brake devices are the only brake devices in the automatic transmission system and the first, second, and third dog clutches are the only clutches in the automatic transmission system.

14. The automatic transmission system of claim 13, wherein the controller includes executable instructions stored in the non-transitory memory that, during operation of the automatic transmission system in the first gear ratio mode, cause the controller to:
deactivate the first brake device; and
wherein the controller includes executable instructions stored in the non-transitory memory that, during operation of the automatic transmission system in the second gear ratio mode, cause the controller to:
deactivate the second brake device.

15. The automatic transmission system of claim 12, wherein the controller includes executable instructions stored in the non-transitory memory that cause the controller to:
coordinate operation of the second brake device, the second dog clutch, and the third dog clutch to transition the automatic transmission system between the second gear ratio mode and a third gear ratio mode.

16. The automatic transmission system of claim 11, wherein the first planetary gear set receives rotational input from an electric machine and the electric machine is electrically coupled to a battery pack incorporated in a vehicle chassis.

* * * * *